Nov. 9, 1948.     I. J. GRUENBERG     2,453,506
SPRAG
Filed Dec. 10, 1945

*INVENTOR.*
IVOR J. GRUENBERG
BY
Whittemore Hulbert & Belknap
ATTORNEYS

Patented Nov. 9, 1948

2,453,506

UNITED STATES PATENT OFFICE 2,453,506

SPRAG

Ivor J. Gruenberg, Pleasant Ridge, Mich., assignor to The Gear Grinding Machine Company, Hamtramck, Mich., a corporation of Michigan Application December 10, 1945, Serial No. 634,007

5 Claims. (Cl. 192—45.1)

The invention relates to sprags such as are used as elements in a one-way clutch for transmitting torque in one direction of rotation between driving and driven members.

It is the object of the invention to obtain a construction of sprag which is adapted for use in clutches of varying radial dimensions and which will automatically compensate for slight inaccuracies in the manufacture thereof. To this end the invention consists in the construction as hereinafter set forth.

Figure 1:
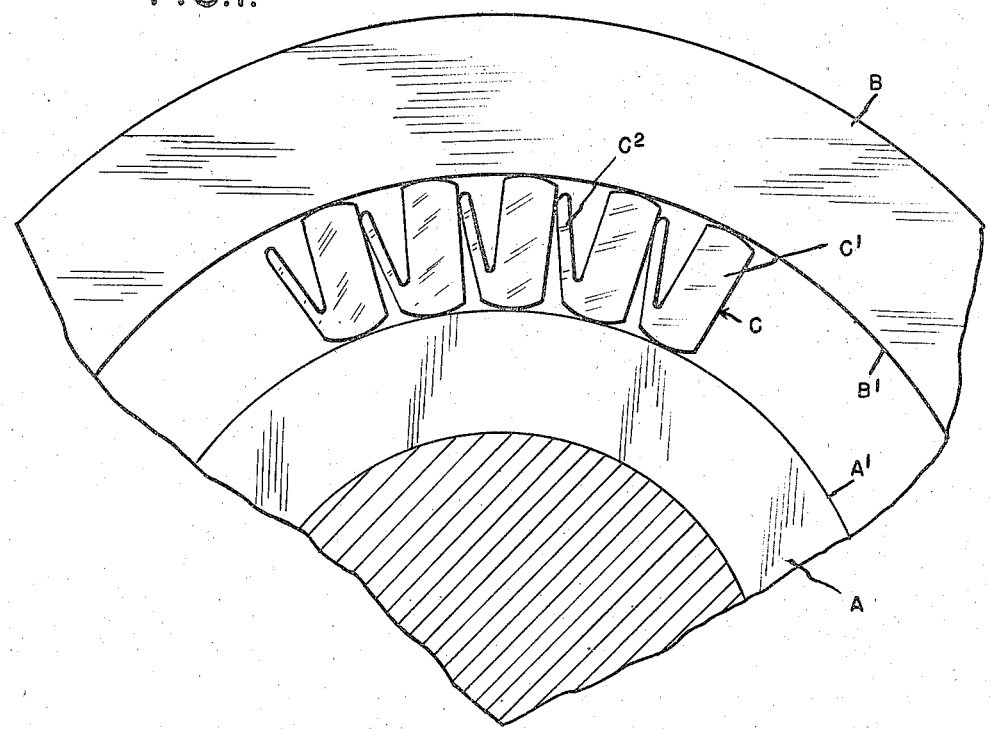
Fig. 1 is a side elevation of a portion of a rotary clutch incorporating my improved construction of sprag.
Figure 2:
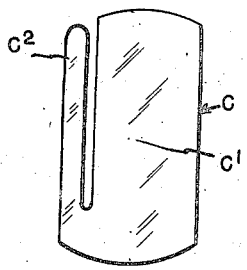
Fig. 2 is an elevation of the partly formed sprag.

A and B are relatively revoluble members having radially spaced concentric cylindrical surfaces A' and B' for receiving therebetween the sprags C. These sprags are of radial length which is in excess of the radial dimension between the surfaces A' and B' so that when placed between said surfaces and in contact therewith each sprag must be slightly inclined. Also, there must be provided clearance between adjacent sprags circumferentially of the clutch for further inclination thereof when the clutch is disengaged. Thus, if the entire annular space between the concentric cylindrical surfaces is occupied by a series of sprags, the dimensions of the latter must be very exact to product proper functioning. It is, however, very difficult in commercial manufacture to maintain such exact dimensions.

In view of the conditions just described, I have devised a construction of sprag having within itself sufficient resiliency to compensate for inaccuracies in commercial manufacture. The construction is also such as to be easily adapted for use in clutches of different radial dimensions. Essentially my improved construction of sprag includes a body portion and an integral resilient finger extending at an oblique angle to the body portion and adapted to bear against the adjacent sprag so as to produce an energizing force therefor. As illustrated, the body C' has eccentric arcuate ends substantially parallel sides and the finger $C^2$ extends from one end of the sprag to a point near the opposite end of the adjacent sprag. Such a construction can be manufactured by first forming a blank of a width to include both the portions C' and $C^2$ and then cutting a slit between said portions and finally bending the finger portion to the desired inclination. After heat treatment of the structure resiliency is imparted to the finger $C^2$ so that it may be deflected to compensate for all inaccuracies while still remaining within its elastic limit.

What I claim as my invention is:

1. A sprag having a body and an integral portion constituting a resilient finger for bearing against an adjacent sprag.

2. A sprag having a body and an integral portion at one side thereof constituting a resilient finger extending from a point adjacent one end of the sprag to beyond the center thereof and adapted to bear against an adjacent sprag.

3. A sprag having a body with eccentric arcuate ends a portion at one side thereof partially severed therefrom to form a resilient finger extending from a point adjacent one end of the sprag to a point beyond the center thereof and adapted to bear against an adjacent sprag.

4. A sprag having a body with eccentric arcuate ends a portion at one side thereof partially severed from the body of the spray to extend from a point adjacent to one end thereof to near the other end, said partially severed portion being bent at an angle to the body portion and constituting a resilient finger for bearing against an adjacent sprag.

5. In a method of forming sprags, the steps of partially severing from a sprag blank having eccentric arcuate ends and a straight side a portion adjacent said side to form a finger, bending said finger at an angle to the body portion and heat treating to impart resiliency to the finger.

IVOR J. GRUENBERG.

REFERENCES CITED

The following references are of record in the file of this patent:

UNITED STATES PATENTS

| Number | Name | Date |
|---|---|---|
| 531,577 | Teal | Dec. 25, 1894 |
| 1,826,415 | Bragg et al. | Oct. 6, 1931 |